R. E. VALENTINE.
MACHINE FOR MAKING BISCUITS OF SHREDDED CEREAL.
APPLICATION FILED JAN. 12, 1914.
1,102,614.
Patented July 7, 1914.
7 SHEETS—SHEET 2.
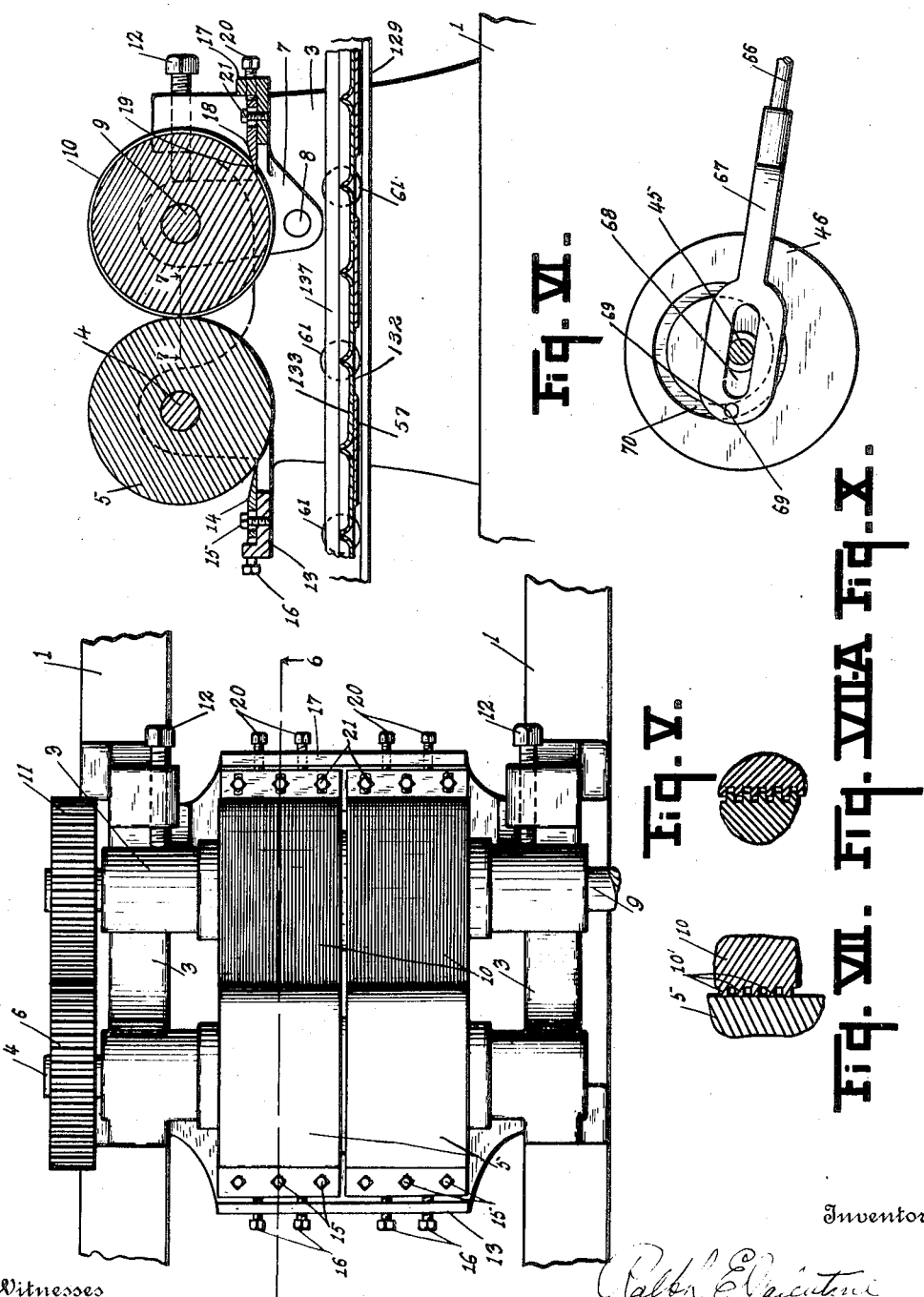

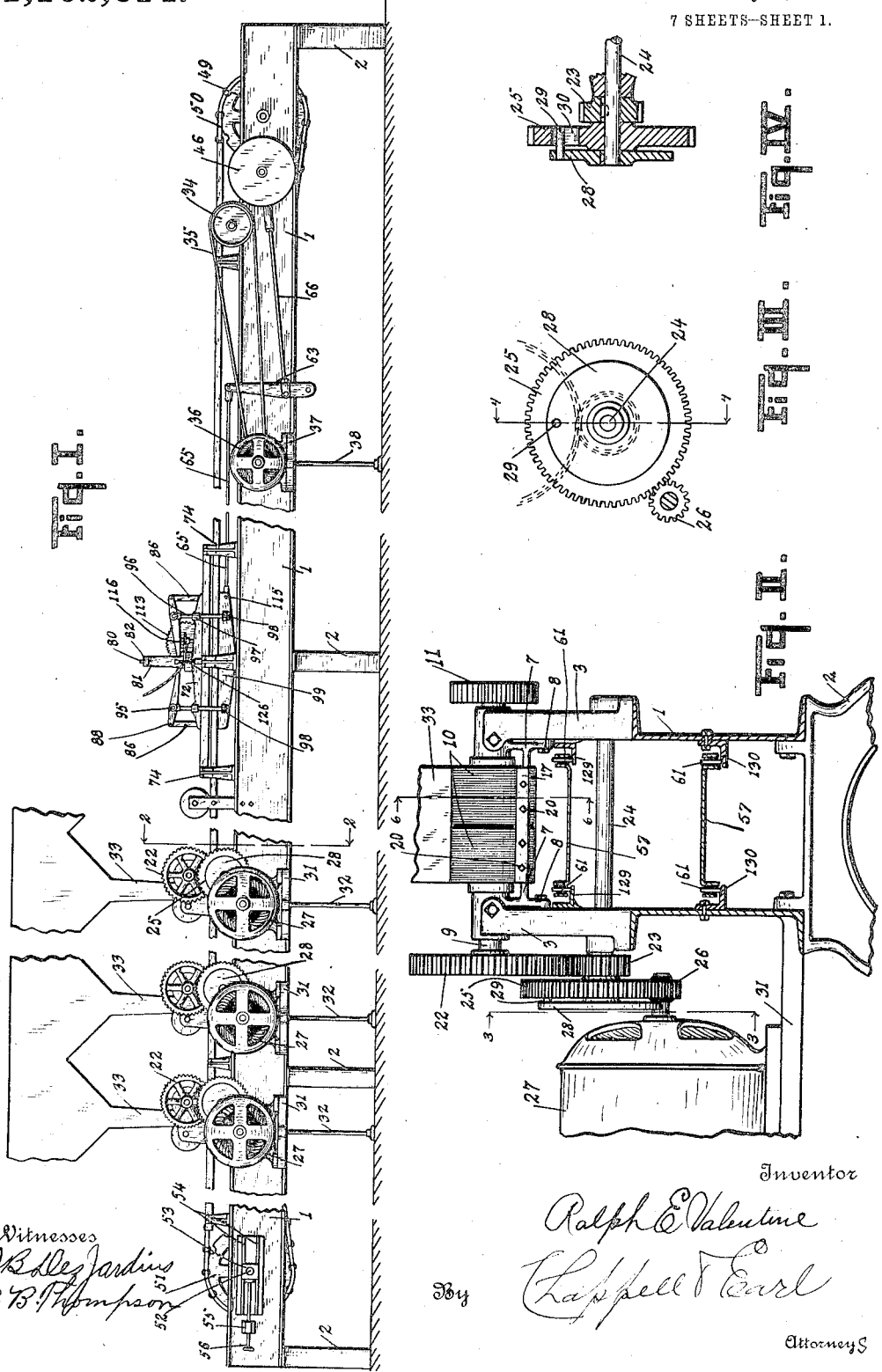
R. E. VALENTINE.
MACHINE FOR MAKING BISCUITS OF SHREDDED CEREAL.
APPLICATION FILED JAN. 12, 1914.
1,102,614.
Patented July 7, 1914.
7 SHEETS—SHEET 1.

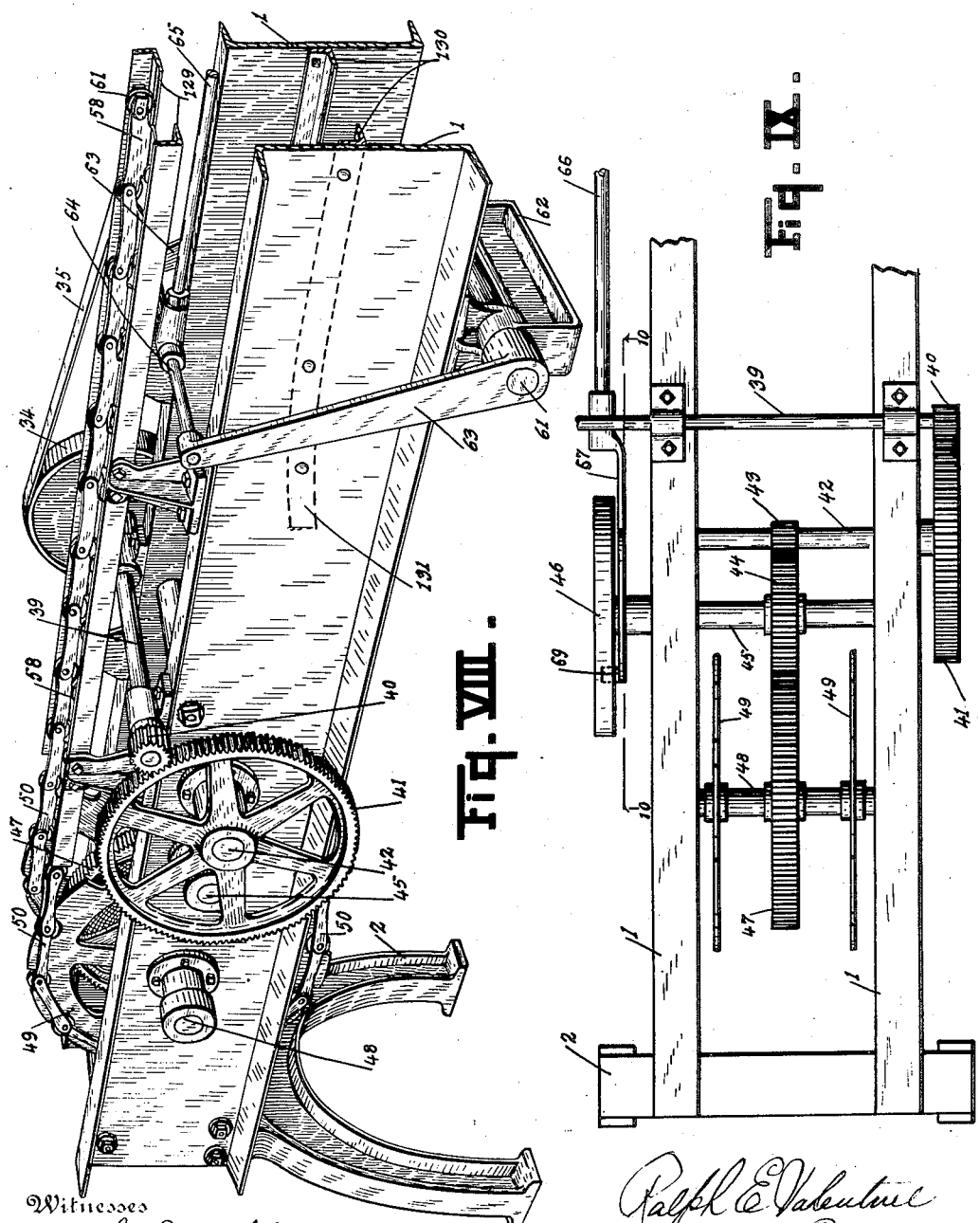

R. E. VALENTINE.
MACHINE FOR MAKING BISCUITS OF SHREDDED CEREAL.
APPLICATION FILED JAN. 12, 1914.
1,102,614.
Patented July 7, 1914.
7 SHEETS—SHEET 4.
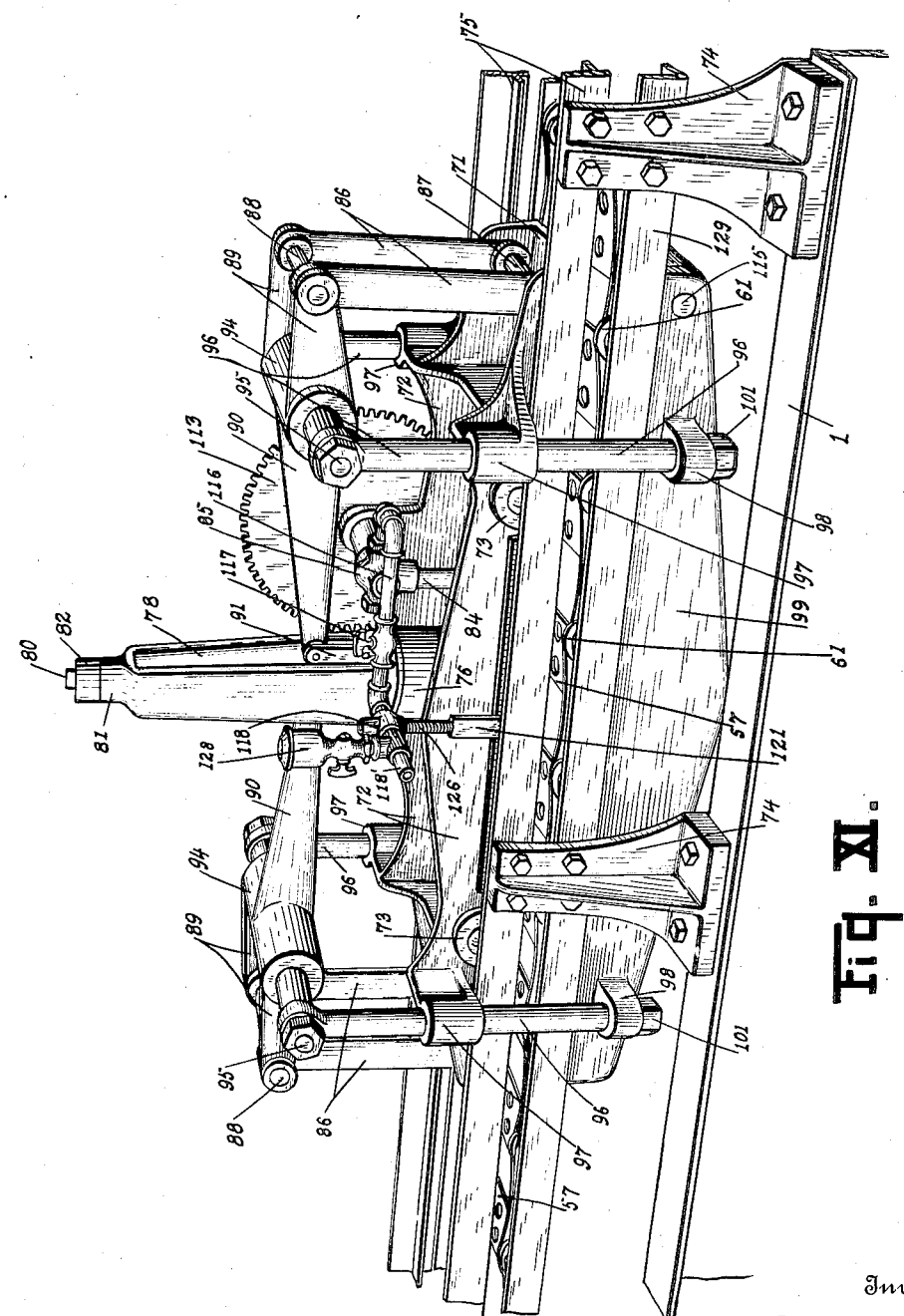
Fig. XI.

R. E. VALENTINE.
MACHINE FOR MAKING BISCUITS OF SHREDDED CEREAL.
APPLICATION FILED JAN. 12, 1914.
1,102,614.
Patented July 7, 1914.
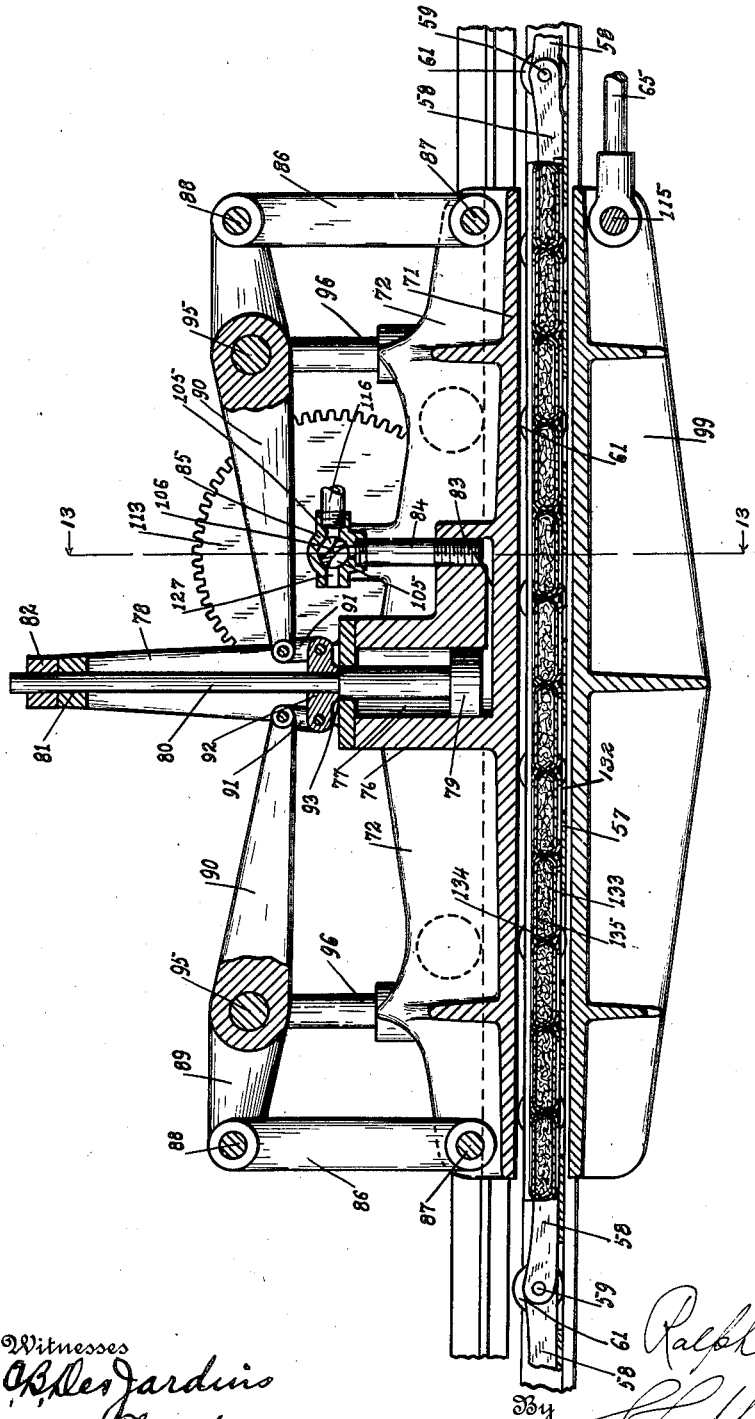
Fig. XII.

R. E. VALENTINE.
MACHINE FOR MAKING BISCUITS OF SHREDDED CEREAL.
APPLICATION FILED JAN. 12, 1914.
1,102,614.
Patented July 7, 1914.
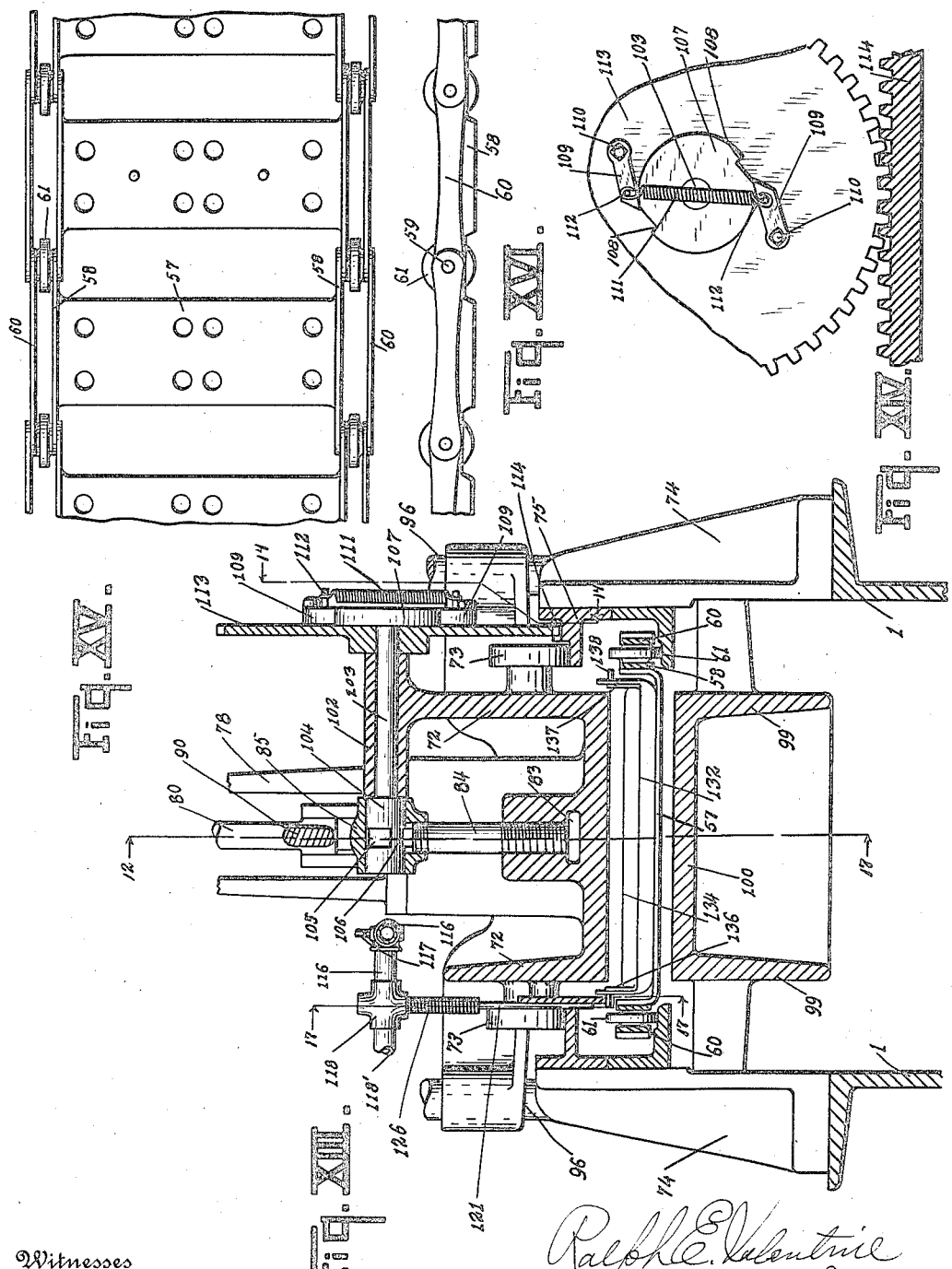

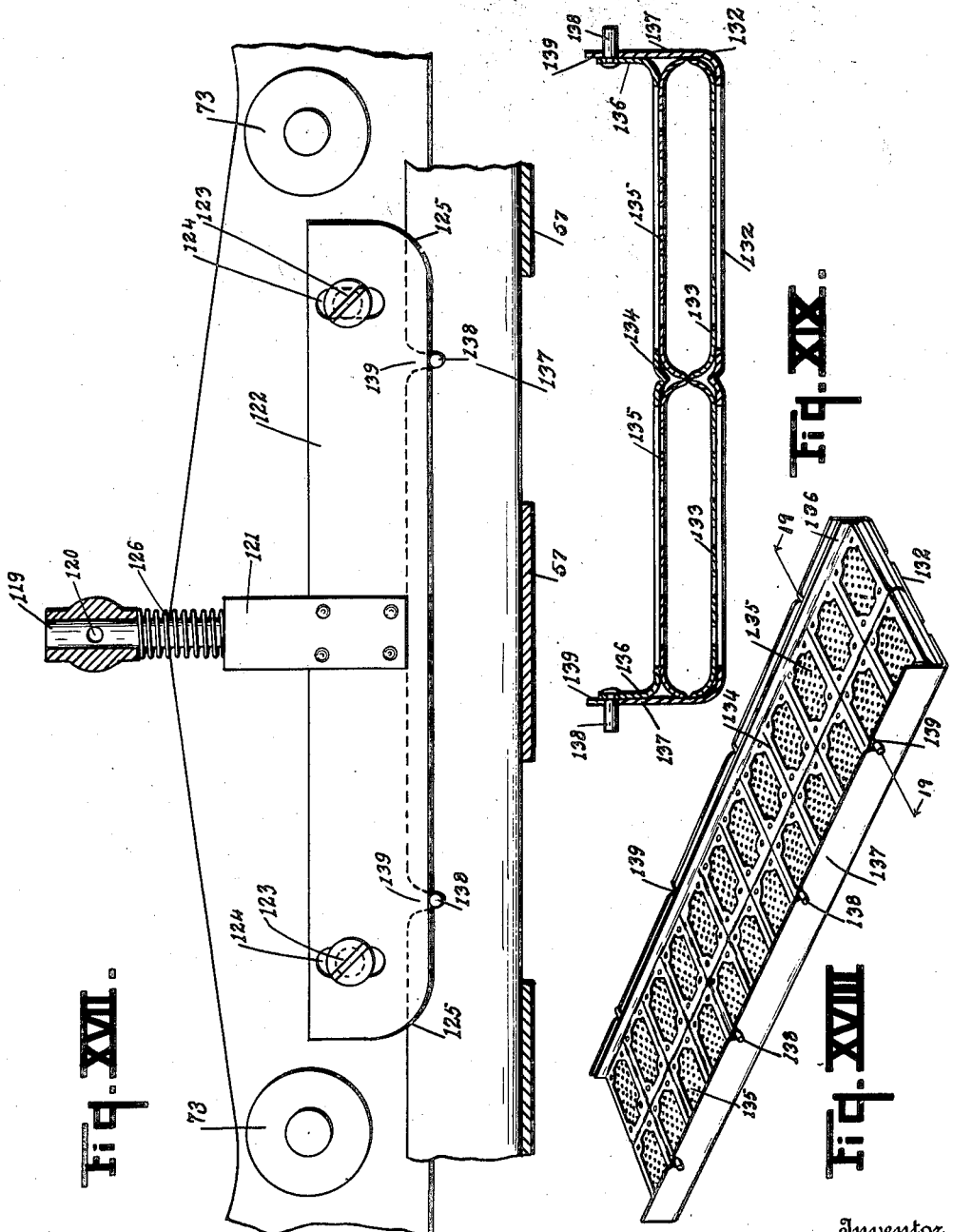

UNITED STATES PATENT OFFICE.

RALPH E. VALENTINE, OF BATTLE CREEK, MICHIGAN, ASSIGNOR TO KELLOGG TOASTED CORN FLAKE CO., OF BATTLE CREEK, MICHIGAN.

MACHINE FOR MAKING BISCUITS OF SHREDDED CEREAL.

1,102,614.     Specification of Letters Patent.     Patented July 7, 1914.

Application filed January 12, 1914. Serial No. 811,609.

*To all whom it may concern:*

Be it known that I, RALPH E. VALENTINE, a citizen of the United States, residing at Battle Creek, Michigan, have invented certain new and useful Improvements in Machines for Making Biscuit of Shredded Cereal, of which the following is a specification.

This invention relates to a new and improved machine for making biscuit of shredded cereal.

The objects of this invention are: First, to provide a machine for making shredded cereal biscuit which delivers layers of the shredded material to the baking pans and molds, and forces the covers thereon. Second, to provide in such a machine an improved automatic device for forcing the covers on the baking pans. Third, to provide in a machine of the type described, improved means for molding the biscuits whereby they are formed without waste. Fourth, to provide in a machine of the type described, means for preventing the operation of the molding means, when the pans and molds passing through the machine are not properly covered.

Further objects, and objects relating to details and economies of construction and operation will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a side elevation of the machine, parts thereof being broken away. Fig. II is a sectional view on the line 2—2 of Fig. I, showing in detail one set of the shredding rolls and its connection with the motor. Fig. III is a sectional view on the line 3—3 of Fig. II, showing in detail the connection of a set of shredding rolls with the motor. Fig. IV is a sectional view on the line 4—4 of Fig. III. Fig. V is a top plan view of a set of shredding rolls, the chutes delivering to said rolls being omitted. Fig. VI is a sectional view on lines 6—6 of Figs. II and V, showing the shredding rolls in further detail. Fig. VII is a sectional view on the line 7—7 of Fig. VI, showing the engagement of the smooth and grooved rolls in detail. Fig. VII$^A$ is a sectional view showing both rolls grooved in accordance with the modified form illustrated in my Patent No. 831,909, of September 23, 1906, the same being sectional on line corresponding to the view of Fig. VII. Fig. VIII is a perspective view of the rear end of the machine. Fig. IX is a top plan view of the rear of the machine, the conveying belt and the guide track therefor being omitted. Fig. X is a sectional view on the line 10—10 of Fig. IX, showing in detail the cam wheel actuating the pitman rod. Fig. XI is a perspective view of the pneumatic device for forcing the covers on the baking pans. Fig. XII is a longitudinal sectional view through said pneumatic device taken on the line 12—12 of Fig. XIII. Fig. XIII is a transverse sectional view taken on the line 13—13 of Fig. XII. Fig. XIV is a sectional view on the line 14—14 of Fig. XIII, showing in detail the connection of the valve operating shaft. Fig. XV is a top plan view of a portion of the conveying belt. Fig. XVI is a view in side elevation of a portion of said belt. Fig. XVII is a sectional view on the line 17—17 of Fig. XIII, showing in detail the slide valve controlling the compressed air supply and the means for operating the same. Fig. XVIII is a perspective view of a baking pan and molds with the cover applied thereto. Fig. XIX is a sectional view through said baking pan on the line 19—19 of Fig. XVIII.

In the drawing, similar reference characters refer to similar parts throughout the several views and the sectional views are taken looking in the direction of the little arrows at the ends of the section lines.

Considering the numbered parts of the drawing, 1—1 are the frame members, which are supported on the base members 2—2 provided at suitable intervals. The machine is provided with a number of sets of shredding rolls, and as each set of rolls is identical, a description of one will suffice.

3—3 are supporting members secured to the top of the frame members 1—1, and having journaled therein the shaft 4 to which the smooth roll 5 is secured. Gear 6 is secured on the outer end of the shaft 4. Links 7 are pivoted at 8 to the supporting members 3—3, and the shaft 9 is journaled in the upper ends of said links, and has secured thereto the grooved roll 10 which has a plurality of grooves 10', as shown in Fig. VII. Shaft 9 carries on its outer end the gear 11 which is in mesh with the gear 6. Set screws 12 are threaded into the upper part of the supporting members 3 and engage the tops of links 7 so as to regulate the engagement of the smooth and grooved rolls. Bracket 13 is secured to the supporting members 3 and carries the scraper 14 engaging the smooth roll 5, and held in adjusted position by means of the set screw 15. Set screw 16 is mounted in the upturned outer end of the bracket 14 and serves to regulate the engagement of the scraper with the smooth roll 5. The links 7 are provided with a similar bracket 17 carrying a scraper provided with a plurality of teeth 18 engaging in the grooves of the roll 10. This scraper is adjusted relative to the rolls by means of the set screw 20 carried by the outer upturned end of the bracket 17 and the scraper is held in adjusted position by means of the set screw 21.

To the inner end of the shaft 9 is secured the gear 22 which is in mesh with a gear 23, splined to the shaft 24, which is journaled in the supporting members 3. On the inner end of shaft 24 is mounted the gear 25 which is in mesh with a gear 26 driven by a motor 27. A disk 28 is splined to the inner end of the shaft 24 and carries a pin 29 engaging in the slot 30 in the gear 25. The motor 27 rests on a bracket 31, supported by the frame member 1 and a standard 32.

The material, preferably prepared in accordance with the process set forth in the application of John L. Kellogg, Serial No. 720,471, filed September 16, 1912, is fed to the shredding rolls through the chutes 23.

39 is a shaft suitably journaled on the frame members 1 and carries on its inner end the pulley 34 which is connected by the belt 35 with a motor 36, resting on a bracket 37, supported by the standard 38 and the frame 1. Shaft 39 carries on its outer end the gear 40 in mesh with the gear 41 on shaft 42, which is suitably journaled in the frame members. Gear 43 is secured to the center of shaft 42 and meshes with a gear 44 carried by shaft 45 which is also suitably journaled in the frame members 1. Shaft 45 carries on its inner end the cam wheel 46. Gear 44 is in mesh with a gear 47 on shaft 48, which is journaled in the frame members 1, and carries the sprocket wheels 49.

On the front end of the machine are provided the sprocket wheels 51, carried on a shaft 52, having its ends journaled in blocks 53 which are disposed in grooved ways 54, secured to the sides of the frame members 1. Adjusting screws 56 are disposed in lugs projecting from the frame members and engage the blocks 53. By this means the shaft 52 can be moved back and forth so as to regulate the tension on the carrying belt.

The conveying belt 50 passes over the sprocket wheels 51 and 49 and carries the pans and molds, to be filled with the shredded cereal, through the machine. This conveyer is made up of the cross members 57 provided at either end with the upstanding members 58 which are connected together by means of the pins 59. The outer ends of said pins are connected together by means of the links 60, and rollers 61 are journaled on said pins between the links 60 and the upstanding members 58, said rollers also serving to keep the links 60 spaced from the upstanding members 58.

Rock shaft 61 is journaled in a bearing 62 secured to the under side of the frame members 1, and upon the ends of this rock shaft are secured the lever arms 63. The upper ends of these lever arms are connected by means of a rod 64, to the center of which is adjustably secured the pitman rod 65. To the inner lever arm 63 the pitman 66 is connected. To the other end of the pitman rod 66 is secured the bar 67, provided with slot 68, through which the shaft 45 passes. The outer end of the bar 67 carries a pin 69 which engages in the cam slot 70 provided in the cam wheel 46. It will thus be seen, that for every revolution of the shaft 45 there is a complete reciprocation of the pitman 66, and this motion is multiplied and communicated to the pitman rod 65 by means of the lever arms 63. The pitman rod 65 is connected to the rear end of the pneumatic device, which I will now describe.

The device for pressing the covers on the baking pans comprises, the base plate 71, provided with the side members 72, on which are journaled the rollers 73 which run on the tracks 75, supported by the brackets 74 on the frame members 1. In the central part of the base plate is provided the housing 76 in which is the piston chamber 77. From the top of the housing 76 is supported the standard 78. The piston 79 moves in the piston chamber 77 and is provided with the piston rod 80, the upper end of which has a bearing 81 in the standard 78. A collar 82 is secured to the upper end of the piston rod to limit its downward movement. Housing 76 is also provided with an air passage 83 communicating with the bottom of the piston chamber and compressed air is supplied to said air passage through the pipe 84 and valve 85.

Links 86 are pivoted on the rods 87 secured at the ends of said base plate, and the upper ends of these links are pivoted on the rods 88 carried by the forked outer ends of the levers 90. The inner ends of these levers are connected by means of links 91 with a collar 92 fitting around the piston rod 80 and resting on a shoulder 93 thereon. The levers 90 are provided with bosses 94 through which pass the rods 95, to the outer ends of which the rods 96 are secured. Rods 96 pass through lugs 97 provided on the side members 72 of the base plate and through lugs 98 provided on the side members 99 of the presser plate 100. The presser plate is held in position by means of the nuts 101 on the threaded lower ends of said rods 96.

In a supporting bracket 102, which is integral with one of the side members 72, is journaled a shaft 103 which carries on its inner end the turning plug 104 in the valve 85. This turning plug is provided with a pair of oppositely disposed slots 105, forming the narrowed portion 106 of said turning plug, which serves to open and close the valve 85'. On the outer end of said shaft 103 is secured the ratchet wheel 107, provided with the teeth 108. Pawls 109 are pivoted at 110 to the gear 113 which is journaled on the shaft 103. These pawls 109 engage the ratchet teeth 108 and are held resiliently in engagement therewith by means of the spring 111 secured at its ends to the pins 112 on the pawls 109. Gear 113 is in mesh with a rack 114 provided on the outer track 75. As a result the gear 113 will be given a rotary motion as the pneumatic device is moved back and forth. Pitman rod 65 is connected to the presser plate 100 at 115.

Compressed air is admitted to the valve 85 through the pipe 116, which is provided with a pet cock 117, and is connected with the main supply pipe 118' by the slide valve 118. The slide valve is provided with a valve rod 119 provided with a port 120 therethrough, through which the compressed air passes when said port is in alinement with the passage through the pipes 118' and 116. To the lower end of the valve rod 119 is secured the bar 121 which is fastened to the plate 122. Plate 122 is slidably connected to the side member 72 by means of screws 123 which pass through the slots 124 in plate 122. The ends of said plate are rounded at 125 so that they will ride up on the pin 138 carried by the covers of the baking pans. Spring 126 is interposed between the bar 121 and the base of the slide valve 118 and serves to hold the plate 122 normally down so that port 120 is out of alinement with the passage through the pipes 118' and 116. By this means the flow of compressed air is cut off except when the covered baking pans are passing through the machine.

127 is the exhaust head for permitting the escapement of air from the piston chamber 77.

128 is an oil cup provided on the supply pipe 118' for oiling the valves.

Tracks 129 are suitably supported from brackets on the frame members 1 and upon these tracks the rollers 61 of the conveyer run as the conveyer passes through the machine. Tracks 130 are also provided, which are secured to the frame members 1 and upon which the rollers 61 of the conveyer travel as the belt is returning to front of the machine. The ends of these tracks are downwardly curved somewhat, as at 131, so that the conveyer will run upon them smoothly.

132 is a baking pan provided with the biscuit molds 133 secured thereto. 134 is the cover for said baking pan to which the molds are secured and which is provided with the upturned flanges 136 fitting snugly inside the upturned flanges 137 of the baking pan. The cover flanges are provided with pins 138 fitting in the notches 139 provided in the flanges of the pan. These pans are fully illustrated and described in my application, No. 673,214, filed January 24, 1912.

From the description of the parts given above the operation of this machine should be very readily understood. The material, which has preferably been prepared in accordance with the process set forth in the application of John L. Kellogg, No. 720,471, referred to above, is delivered by the chutes 33 to the shredding rolls 5 and 10. These rolls are geared to turn in opposite directions and act as squeeze rolls. Due to the grooved roll 10 the material is delivered from the rolls into the pans below, which are carried by the conveyer belt, in a shredded condition. Each set of shredding rolls delivers a layer of shredded material into the baking pan, and as many sets of rolls can be provided as desired, depending upon the number of layers of shreds which it is desired to incorporate into the biscuit. Each set of shredding rolls is driven by a separate electric motor. The scrapers 14 and 18 serve to keep the rolls clean. The baking pans are placed upon the conveyer before it reaches the first set of shredding rolls. After the pans carried by the conveyer leave the last set of shredding rolls, covers are placed thereon with the pins 138 engaging in the notches 139 of the pans. The sprocket wheels which move the conveyer are driven by the motor 36 which is connected to the pulley 34, the latter being connected by a train of gears with the sprocket wheels 49. The train of gears also serves to drive the shaft 45 carrying the cam wheel 46 and, due to the engagement of the pin 69 in the cam slot 70 carried by said cam wheel, a reciprocating movement is imparted to the pitman rod 66. This reciprocating movement is communicated to the pitman rod 65 and multiplied by means of the lever arm 63. In this manner, the device for pressing the covers on the baking pans is given a reciprocating movement by the motor 36, the pulley 34 and the train of gears connected thereto. The gears are so proportioned and the pitman rod 66 is connected to the lever arm 63 at such a point that the device for pressing the covers on the pans is moved at the same rate as the conveyer which carries the pans through the machine. Due to the engagement of the gear 113 with the rack 114, carried by the fixed track 75, the gear 113 is given a rotary motion as the device is moved back and forth. When the device is being moved toward the front of the machine, that is, in a direction opposite to the movement of the conveyer, the pawls 109 ride over the surface of the ratchet wheel and no motion is communicated to the shaft 103. However, when the device is moved in the same direction as the moving conveyer, the pawls 109 engage the ratchet teeth 108 and turn the shaft 103 with the gear 113. This turns the plug 104 so as to admit air from the compressed air supply through the air passage 83 into the piston chamber. This lifts the piston 79 and forces upwardly the inner ends on the ends of links 86. The result of this movement is to lift the presser plate 100 by means of the rods 96 and force the same against the bottom of the conveyer belt so as to clamp the baking pans and their covers between the base plate 72, and the presser plate 100. This securely clamps the covers upon the pans. A further movement of the device causes the gear 113 to rotate so as to turn the plug and open the passage from the pipe 84 to the exhaust head 127 so as to relieve the pressure in the piston chamber and allow the piston 79 to drop. The weight of the presser plate 100 will cause it to drop and aid in returning the parts to their normal position. The slide valve 118 is provided so that the compressed air supply is automatically cut off except when covered baking pans are passing through the machine. This is due to the fact that the bottom edge of the plate 122 engages the pins 138 on the pan covers and lifts the valve rod 119 so as to bring the port 120 into alinement and admit compressed air to the pipe 116. If no pans are passing through the machine, or the pans which are passing through the machine do not have covers thereon, the plate 122 will not be lifted and the air will be cut off.

In Fig. I the device for pressing the covers on the baking pans is shown at the beginning of its stroke. As the device is drawn forward by the pitman rod 65 in time with the moving belt, the valve 85 opens so as to admit compressed air to the piston chamber to lift the piston. This lifts the presser plate against the bottom of the conveyer and clamps the covers on the pans. During the last part of this movement the valve is opened so as to relieve the pressure in the piston chamber and allow the parts to return to their normal position. When the device is ready to start on its return movement, the presser plate is free from the belt and the pans. As the device is moved backward to its first position, the pawls 109 ride on the surface of the ratchet wheel 107 and hence the shaft 103 is not rotated, and the valve is left in the position in which it was at the end of the forward stroke of the device. The device moves backward until it is in its original position when the operation is repeated. It will thus be seen that at each revolution of the cam wheel the device presses the cover on one baking pan and moves back into position to receive a new pan.

It is evident that while I have shown and described electric motors for driving the shredding rolls and the conveyer connected thereto, that other means of driving these parts might be used. Furthermore, while I have described this machine as adapted to treat material prepared in accordance with the process set forth in the application of John L. Kellogg, above referred to, it is evident that this machine may be used for making biscuits from any material requiring a similar treatment. The baking pans are delivered from the rear of the machine and are then placed in the oven for baking.

I show in Fig. VII$^A$ a modification of the grooving of the rolls which is available for use in a machine of this kind, in which both sets of rolls are grooved in accordance with my Patent No. 831,909, of Sept. 25, 1906.

I am aware that the particular embodiment here set forth, is susceptible of considerable variation without departing from the spirit of my invention, and I, therefore, do not wish to be restricted to the same. However, I have found that in actual practice this embodiment is to be preferred, and I desire to claim the same specifically as well as broadly as indicated by the appended claims.

Having thus described my invention, what I claim as new and desire to secure by Letters Patent, is:—

1. In a machine of the class described, the combination of a frame, sprocket wheels suitably journaled thereon, a conveyer belt carried by said sprocket wheels and adapted to carry baking pans through the machine, means for driving said sprocket wheels, a plurality of sets of shredding rolls journaled on said frame and adapted to deliver layers of shredded material to said baking pans, independent means for driving each set of shredding rolls, a device for pressing covers on said pans, a cam wheel, means for driving the same operatively connected with said sprocket driving means, and a pitman rod connected to said device for reciprocating the same, reciprocatory motion being communicated to said pitman rod by means of the cam wheel, all coacting as specified.

2. In a machine of the class described, the combination of a frame, sprocket wheels suitably journaled thereon, a conveyer belt carried by said sprocket wheels and adapted to carry baking pans through the machine, means for driving said sprocket wheels, a plurality of sets of shredding rolls journaled on said frame and adapted to deliver layers of shredded material to said baking pans, means for driving said shredding rolls, a device for pressing covers on said pans, a cam wheel, means for driving the same, and a pitman rod connected to said device for reciprocating the same, reciprocatory motion being communicated to said pitman rod by the cam wheel, all coacting substantially as described for the purpose specified.

3. In a machine of the class described, the combination of a frame, sprocket wheels suitably journaled thereon, a conveyer belt carried by said sprocket wheels and adapted to carry baking pans through the machine, means for driving said sprocket wheels, a plurality of sets of shredding rolls journaled on said frame and adapted to deliver layers of shredded material to said baking pans, means for driving said shredding rolls, a device for pressing covers on said pans, and means for reciprocating said device, all coacting substantially as described for the purpose specified.

4. In a machine of the class described, the combination of a frame, a conveyer belt adapted to carry baking pans through the machine, and a device for pressing covers on said pans, comprising a base plate carried above said conveyer belt and provided with side members, rollers journaled on said side members, tracks secured to said frame on which said rollers travel, a housing provided on said base plate, a piston chamber in said housing, an air passage communicating with the bottom of said piston chamber, a piston reciprocating in said piston chamber and provided with a piston rod, a collar slidably mounted on said piston rod and resting on a shoulder thereon, links pivoted to the ends of said base plate, levers having forked outer ends pivoted to the upper ends of said links, the inner ends of said levers being pivotally connected to said collar, a presser plate disposed beneath said conveyer belt, rods pivotally connected to said levers and secured to said presser plate, lugs on the side members of said base plate through which said rods pass, a valve controlled by the forward movement of said device, for admitting compressed air to said air passage, means, adapted to be actuated by the covers on the baking pans, for admitting compressed air to said valve, and means for reciprocating said device.

5. In a machine of the class described, the combination of a frame, a conveyer belt adapted to carry baking pans through the machine, and a device for pressing covers on said baking pans, comprising a base plate carried above said conveyer belt and provided with side members, a housing provided on said base plate, a piston chamber in said housing, an air passage communicating with the bottom of said piston chamber, a piston reciprocating in said piston chamber and provided with a piston rod, a collar slidably mounted on said piston rod and resting on a shoulder thereon, links pivoted to the ends of said base plate, levers having forked outer ends pivoted to the upper ends of said links, the inner ends of said levers being pivotally connected to said collar, a presser plate disposed beneath said conveyer belt, rods pivotally connected to said levers, and secured to said presser plate, lugs on the side members of said base plate through which said rods pass, a valve controlled by the forward movement of said device for admitting compressed air to said air passage, means, adapted to be actuated by the covers on the baking pans, for admitting compressed air to said valve, and means for reciprocating said device.

6. In a machine of the class described, the combination of a frame, a conveyer belt adapted to carry baking pans through the machine, and a device for pressing covers on said pans, comprising a base plate carried above said conveyer belt and provided with side members, a housing provided on said base plate, a piston chamber in said housing, an air passage communicating with the bottom of said piston chamber, a piston reciprocating in said piston chamber and provided with a piston rod, links pivoted to the ends of said base plate, levers having forked outer ends pivoted to the upper ends of said links, the inner ends of said levers being pivotally connected to said piston rod, a presser plate disposed beneath said conveyer belt, rods pivotally connected to said lever and secured to said presser plate, lugs on the side members of said base plate through which said rods pass, a valve controlled by the forward movement of said device for admitting compressed air to said air passage, means, adapted to be actuated by the covers on said baking pans, for admitting compressed air to said valve and means for reciprocating said device, all coacting substantially as desrribed for the purpose specified.

7. In a machine of the class described, the combination of a frame, a conveyer belt adapted to carry baking pans through the machine, and a device for pressing covers on said pans, comprising a base plate carried above said conveyer belt, a housing provided on said base plate, a piston chamber in said housing, an air passage communicating with the bottom of said piston chamber, a piston reciprocating in said piston chamber and provided with a piston rod, links pivoted to the ends of said base plate, levers having forked outer ends pivoted to the upper ends of said links, the inner ends of said levers being pivotally connected to said piston rod, a presser plate disposed beneath said conveyer belt, means connecting said presser plate with said levers, a valve controlled by the forward movement of said device for admitting compressed air to said air passage, means, adapted to be actuated by the covers on said baking pans, for admitting compressed air to said valve, and means for reciprocating said device, all coacting substantially as described for the purpose specified.

8. In a machine of the class described, the combination of a frame, a conveyer belt adapted to carry baking pans through the machine, and a device for pressing covers on said pans, comprising a base plate carried above said conveyer belt, a housing provided on said base plate, a piston chamber in said housing, an air passage communicating with the bottom of said piston chamber, a piston reciprocating in said piston chamber, and provided with a piston rod, levers fulcrumed on the ends of said base plate, the inner ends of said levers being pivotally connected to said piston rod, a presser plate disposed beneath said conveyer belt, means connecting said levers with said presser plate, a valve controlled by the forward movement of said device for admitting compressed air to said air passage, means, adapted to be actuated by the covers on said baking pans, for admitting compressed air to said valve, and means for reciprocating said device, all coacting substantially as described for the purpose specified.

9. In a machine of the class described, the combination of a frame, a conveyer belt adapted to carry baking pans through the machine, and a device for pressing covers on said pans, comprising a base plate carried above said conveyer belt, levers fulcrumed on the ends of said base plate, a presser plate disposed beneath said conveyer belt, means connecting said levers with said presser plate, means controlled by the forward movement of said device and the covers on said baking pans for lifting the inner ends of said levers, and means for reciprocating said device, all coacting substantially as described for the purpose specified.

10. In a machine of the class described, the combination of a frame, a conveyer belt adapted to carry baking pans through the machine, and a device for pressing covers on said pans, comprising a base plate carried above said conveyer belt, a housing on said base plate, a piston chamber in said housing, a piston reciprocating in said piston chamber, a presser plate disposed beneath said conveyer belt, means operated by said piston for lifting said presser plate against said conveyer belt, a valve controlled by the forward movement of said device for admitting compressed air to said piston chamber, means, adapted to be actuated by the covers on said pans, for admitting compressed air to said valve and means for reciprocating said device, all coacting substantially as described for the purpose specified.

11. In a machine of the class described, the combination of a frame, a conveyer belt adapted to carry baking pans through the machine, and a device for pressing covers on said pans, comprising a base plate carried above said conveyer belt, a housing on said base plate, a piston chamber in said housing, a presser plate disposed beneath said conveyer belt, means operated by said piston for lifting said presser plate against said conveyer belt, a valve for admitting compressed air to said piston chamber, a valve operating shaft suitably journaled on said base plate, a turning plug operating in said valve and carried on one end of said shaft, a ratchet wheel on the other end of said shaft, a gear rotatably mounted on said shaft and in mesh with a rack carried by the frame, pawls pivoted on said gear and engaging ratchet teeth on said ratchet wheel, a spring resiliently holding said pawls in engagement with said ratchet wheel, means adapted to be actuated by the covers on said baking pans, for admitting compressed air to said valve, and means for reciprocating said device, all coacting substantially as described for the purpose specified.

12. In a machine of the class described, the combination of a frame, a conveyer belt adapted to carry baking pans through the machine, and a device for pressing covers on said pans, comprising a base plate carried above said conveyer belt, a housing on said base plate, a piston chamber in said housing, a piston reciprocating in said piston chamber, a presser plate disposed beneath said conveyer belt, means operated by said piston for lifting said presser plate against said conveyer belt, a valve for admitting compressed air to said piston chamber, a valve operating shaft suitably journaled on said base plate, a turning plug operating in said valve and carried on one end of said shaft, a ratchet wheel on the other end of said shaft, a gear rotatably mounted on said shaft and in mesh with a rack carried by the frame, means operatively connecting said ratchet wheel with said gear during the forward movement of the device, means, adapted to be actuated by the covers on the baking pans, for admitting compressed air to said valve and means for reciprocating said device, all coacting substantially as described for the purpose specified.

13. In a machine of the class described, the combination of a frame, a conveyer belt adapted to carry baking pans through the machine, and a device for pressing covers on said pans, comprising a base plate carried above said conveyer belt, a housing on said base plate, a piston chamber in said housing, a piston reciprocating in said piston chamber, a presser plate disposed beneath said conveyer belt, means operated by said piston for lifting said presser plate against said conveyer belt, a valve for admitting compressed air to said piston chamber, a suitably journaled valve operating shaft, a turning plug operating in said valve and carried on one end of said shaft, means whereby the forward movement of the device rotates said shaft, means, adapted to be actuated by the covers on said baking pans, for admitting compressed air to said valve, and means for reciprocating said device, all coacting substantially as described for the purpose specified.

14. In a machine of the class described, the combination of a frame, a conveyer belt adapted to carry baking pans through the machine, and a device for pressing covers on said pans, comprising a base plate carried above said conveyer belt, a housing on said base plate, a piston chamber in said housing, a piston reciprocating in said piston chamber, a presser plate disposed beneath said conveyer belt, means operated by said piston for lifting said presser plate against said conveyer belt, a valve for admitting compressed air to said piston chamber, means whereby the forward movement of the device opens and closes said valve, means, adapted to be actuated by the covers on said baking pans, for admitting compressed air to said valve, and means for reciprocating said device, all coacting substantially as described for the purpose specified.

15. In a machine of the class described, the combination of a frame, a conveyer belt adapted to carry baking pans through the machine, and a device for pressing covers on said pans, comprising a base plate carried above said conveyer belt, a housing on said base plate, a piston chamber in said housing, a piston reciprocating in said piston chamber, a presser plate disposed beneath said conveyer belt, means operated by said piston for lifting said presser plate against said conveyer belt, a valve for admitting compressed air to said piston chamber, means whereby the forward movement of the device opens and closes said valve, a pipe admitting compressed air to said valve, a slide valve in said pipe comprising a valve rod, a plate secured to the lower end of said rod and adapted to be engaged by pins on the pan covers to lift said rod, a port in said valve rod adapted to be brought into alinement with the passage through said pipe when said plate is lifted, a spring normally holding said rod with the port out of alinement with said passage, and means for reciprocating the device, all coacting substantially as described, for the purpose specified.

16. In a machine of the class described, the combination of a frame, a conveyer belt adapted to carry baking pans through the machine, and a device for pressing covers on said pans, comprising a base plate carried above said conveyer belt, a housing on said base plate, a piston chamber in said housing, a piston reciprocating in said piston chamber, a presser plate disposed beneath said conveyer belt, means operated by said piston for lifting said presser plate against said conveyer belt, a valve admitting compressed air to said piston chamber, means whereby the forward movement of the device opens and closes said valve, a pipe admitting compressed air to said valve, a slide valve in said pipe comprising a valve rod, means on the lower end of said valve rod adapted to be engaged by pins on the pan covers to lift said rod, a port in said valve rod adapted to be brought into alinement with the passage through said pipe when said plate is lifted, and means for reciprocating said device, all coacting substantially as described for the purpose specified.

17. In a machine of the class described, the combination of a frame, a conveyer belt adapted to carry baking pans through the machine, and a device for pressing covers on said pans, comprising a base plate carried above said conveyer belt, a housing on said base plate, a piston chamber in said housing, a piston reciprocating in said piston chamber, a presser plate disposed beneath said conveyer belt, means operated by said piston for lifting said presser plate against said conveyer belt, a valve admitting compressed air to said piston chamber, means, whereby the forward movement of the device, opens and closes said valve, means, adapted to be actuated by the covers on said baking pans for admitting compressed air to said valve, a pitman rod connected to said presser plate, lever arms journaled on said frame and connected to the other end of said pitman rod, a second pitman rod connected to one of said lever arms, a slotted bar on the other end of said pitman rod, a pin on the outer end of said bar, a cam wheel having a cam slot therein in which said pin engages, a shaft on which said cam wheel is mounted, said shaft passing through the slot in said bar and means for driving said shaft, all co-acting substantially as described for the purpose specified.

18. In a machine of the class described, the combination of a frame, a conveyer belt adapted to carry baking pans through the machine, and a device for pressing covers on said pans, comprising a base plate carried above said conveyer belt, a housing on said base plate, a piston chamber in said housing, a piston reciprocating in said piston chamber, a presser plate disposed beneath said conveyer belt, means operated by said piston for lifting said presser plate against said conveyer belt, a valve admitting compressed air to said piston chamber, means, whereby the forward movement of the device opens and closes said valve, means adapted to be actuated by the covers on said baking pans for admitting compressed air to said valve, a pitman rod connected to said presser plate, lever arms journaled on said frame and connected to the other end of said pitman rod, a second pitman rod connected to one of said lever arms, means for reciprocating said second pitman rod, all coacting substantially as described for the purpose specified.

In witness whereof, I have hereunto set my hand and seal in the presence of two witnesses.

RALPH E. VALENTINE. [L. S.]

Witnesses:
C. B. Des Jardins,
G. B. Thompson.